US010517060B2

(12) United States Patent
Horner et al.

(10) Patent No.: US 10,517,060 B2
(45) Date of Patent: *Dec. 24, 2019

(54) WIRELESS COMMUNICATION NETWORK WITH DISTRIBUTED DEVICE LOCATION DETERMINATION

(71) Applicant: Riverbed Technology, Inc., San Francisco, CA (US)

(72) Inventors: Jack Horner, Thousand Oaks, CA (US); Dirk I. Gates, Westlake Village, CA (US)

(73) Assignee: Cambium Networks, Ltd., Ashburton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,417

(22) Filed: Apr. 24, 2017

(65) Prior Publication Data
US 2018/0020420 A1 Jan. 18, 2018

Related U.S. Application Data

(63) Continuation of application No. 15/208,274, filed on Jul. 12, 2016, now Pat. No. 9,668,233.

(51) Int. Cl.
*H04W 64/00* (2009.01)
*H04B 17/318* (2015.01)
(Continued)

(52) U.S. Cl.
CPC .......... *H04W 64/00* (2013.01); *G01C 21/206* (2013.01); *G01S 5/0036* (2013.01); *G01S 5/0072* (2013.01);
(Continued)

(58) Field of Classification Search
CPC ..... H04B 17/318; H04B 17/27; H04W 64/00; H04W 84/12; H04W 88/08; G01C 21/206;
(Continued)

(56) References Cited

U.S. PATENT DOCUMENTS 7,308,276 B2   12/2007   Goren et al.
7,312,752 B2   12/2007   Smith et al.
(Continued)

OTHER PUBLICATIONS

Navarro, E., Peuker, B., and Quan, M. 2010. Wi-Fi Localization Using RSSI Fingerprinting. Technical Report. California Polytechnic State University, United States of America. http://digitalcommons.calpoly.edu/cpesp/17/.
(Continued)

*Primary Examiner* — Dinh Nguyen
(74) *Attorney, Agent, or Firm* — SoCal IP Law Group LLP; John E. Gunther

(57) ABSTRACT

There are disclosed methods and access points for estimating a location of a user device in a wireless communications network. A plurality of access points define respective received signal strength indicator (RSSI) values for transmissions received from the user device. Each of the plurality of access points sends the respective RSSI values to the other access points of the plurality of access points. One of the plurality of access points self-elects to estimate the location of the user device. The self-elected access point estimates a location of the user device based, at least in part, on the RSSI values.

21 Claims, 7 Drawing Sheets

(51) Int. Cl.
*G01C 21/20* (2006.01)
*G01S 5/00* (2006.01)
*G01S 5/02* (2010.01)
*H04B 17/27* (2015.01)
*H04W 84/12* (2009.01)
*H04W 88/08* (2009.01)

(52) U.S. Cl.
CPC .............. *G01S 5/0081* (2013.01); *G01S 5/02* (2013.01); *G01S 5/0221* (2013.01); *G01S 5/0284* (2013.01); *G01S 5/0289* (2013.01); *H04B 17/27* (2015.01); *H04B 17/318* (2015.01); *G01C 21/20* (2013.01); *H04W 84/12* (2013.01); *H04W 88/08* (2013.01)

(58) Field of Classification Search
CPC ..... G01C 21/20; G01S 5/0036; G01S 5/0072; G01S 5/0081; G01S 5/02; G01S 5/0221; G01S 5/0284; G01S 5/0289
See application file for complete search history.

(56) References Cited

U.S. PATENT DOCUMENTS

| | | | |
|---|---|---|---|
| 7,359,718 | B2 | 4/2008 | Tao et al. |
| 8,971,922 | B2 | 3/2015 | Lim et al. |
| 9,213,079 | B2 | 12/2015 | Kenington et al. |
| 2008/0303901 | A1 | 12/2008 | Variyath et al. |
| 2010/0130244 | A1* | 5/2010 | Hong ............... H04W 72/1231 455/522 |
| 2012/0154218 | A1 | 6/2012 | Mia et al. |
| 2013/0082878 | A1* | 4/2013 | Jarvis ....................... G01S 5/02 342/458 |
| 2013/0257657 | A1 | 10/2013 | Garin et al. |
| 2014/0256353 | A1* | 9/2014 | Denis .................. G01S 5/0278 455/456.1 |
| 2016/0262163 | A1* | 9/2016 | Gonzalez Garrido ...................... H04W 16/10 |

OTHER PUBLICATIONS

Grossman, U. et al. RSSI-based WLAN indoor positioning used within a digital museum guide. International Scientific Journal of Computing. 2008. vol. 7, Issue 2, 66-72.

P. Bahl and V. N. Padmanabhan. Radar: An in-building RF-based user location and tracking system. In Proceedings of the IEEE Infocom, pp. 775-784, Tel-Aviv, Israel, Mar. 2000.

Ambili Thottam Parameswaran, Mohammad Iftekhar Husain and Shambhu Upadahyaya, "Is RSSI a Reliable Parameter in Sensor Localization Algorithms—An Experimental Study," Field Failure Data Analysis Workshop (F2DA'09), New York, 2009.

Yang, J., and Y. Chen, Indoor localization using improved RSS-based lateration methods, in IEEE Global Telecommunications Conference, 2009, pp. 1-6, IEEE Press, Piscataway, N. J.

Q. Dong, W. Dargie, Evaluation of the reliability of rssi for indoor localization,in: Wireless Communications in Unusual and Confined Areas (ICWCUCA), 2012 International Conference on, 2012, pp. 1-6.

* cited by examiner

WIRELESS COMMUNICATION NETWORK WITH DISTRIBUTED DEVICE LOCATION DETERMINATION

RELATED APPLICATION INFORMATION

This application is a continuation of application Ser. No. 15/208,274, filed Jul. 12, 2016, titled WIRELESS COMMUNICATION NETWORK WITH DISTRIBUTED DEVICE LOCATION DETERMINATION, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to wireless local area networks and, in particular, to wireless local area networks that support provide device location services.

Description of the Related Art

Current wireless local area networks (LANs) commonly adhere to the Wi-Fi™ industry standard which is based on the Institute of Electrical and Electronics Engineers' (IEEE) 802.11 standards. The fundamental building block of an 802.11 LAN is a basic service set (BSS) comprising two or more "stations" or devices in wireless communication with each other. IEEE 802.11 defines an "infrastructure mode" in which each BSS includes an "access point" that acts as a master to control the stations within that BSS. A wireless network may be composed of a single access point or many access points, and a single user device or a very large number of user devices. For example, a wireless local area network for a large facility, such as a university campus, hotel, or convention center may include hundreds of access points in communications with 20,000 or more user devices. A wireless network may provide location services, which is to say a wireless network may provide, upon request, the location or approximate location of any of the user devices connected to the network.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
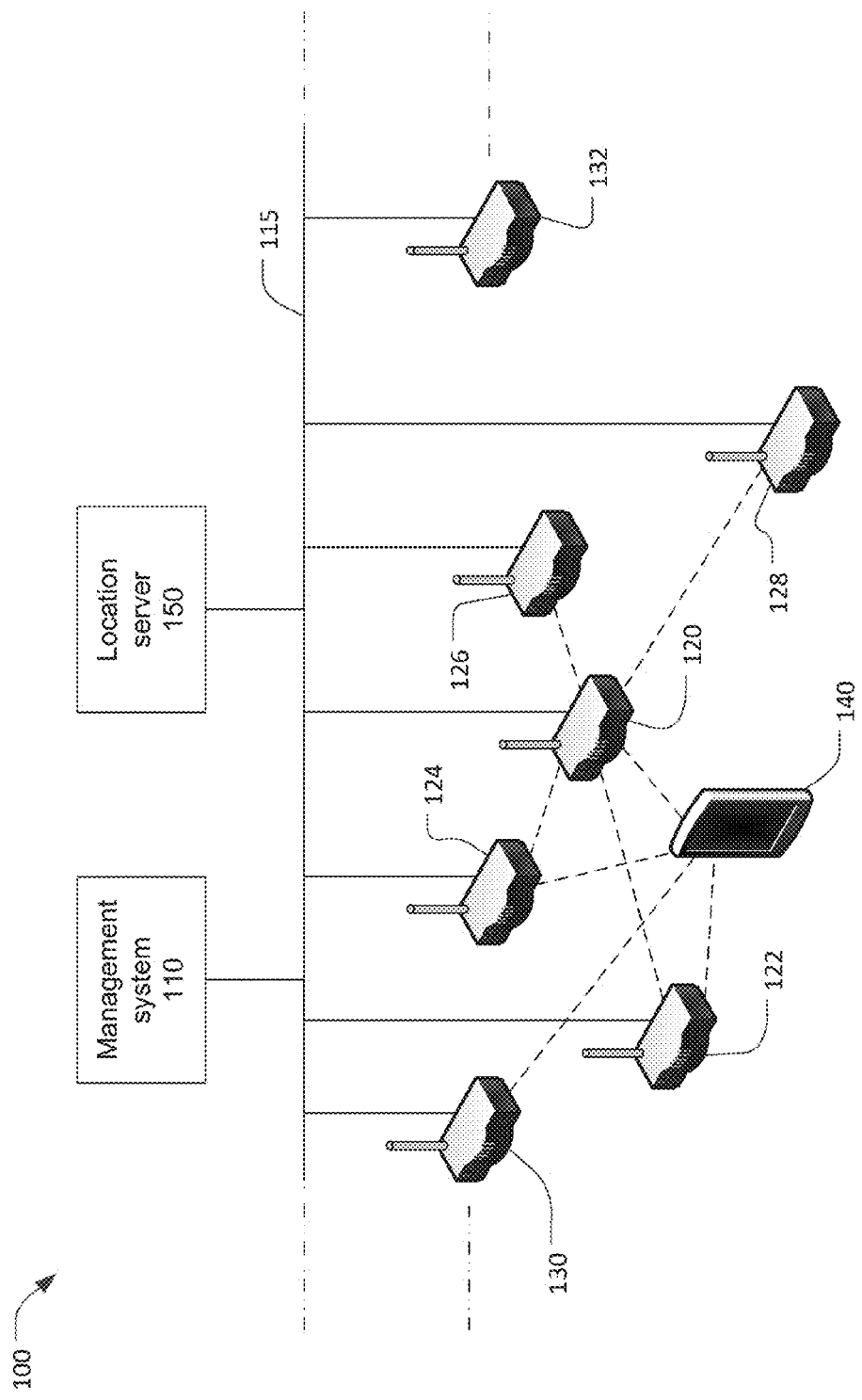
FIG. 1 is a block diagram of a wireless network system.

FIG. 1 is a block diagram of a wireless network system 100 which includes a management system 110, a plurality of access points 120, 122, 124, 126, 128, 130, 132, a location server 150, and a single user device 140. The wireless network system 100 may include additional access points and additional user devices, which are not shown. For ease of recognition, the access points 120-132 in FIG. 1 and subsequent figures are depicted as identical consumer wireless routers. The access points may take other physical forms, and need not be identical. Further, a single physical unit may hold multiple access points, and each access point may logically support multiple virtual access points.

For ease of recognition, the user device 140 in FIG. 1 and subsequent figures is depicted as a smart phone. The depiction of a smart phone is exemplary. User devices connected to the wireless network system 100 may include smart phones, computing tablets, portable computers, desk-top computers, computer peripheral devices such as printers and scanners, embedded computers in appliances and other products, and other devices capable of wireless communications.

The management system 110 and the location server 150 may be a single server computer or separate server computers. The management system 110 and the location server 150 may be distributed between two or more real or virtual servers. All or portions of the management system 110 and the location server 150 may be co-located with one or more of the access points 120-132. All or portions of the management system 110 and the location server 150 may be located in the cloud, or may be services provided by a real or virtual server in the cloud. In this context, "the cloud" means the Internet and all of the computing resources connected by the Internet.

In FIG. 1, a solid line connection between elements indicates a management communications path between elements of the wireless network system 100. The management system 110, the plurality of access points 120 to 132, and the location server 150 are connected by a communications network 115. The communications network 115 may be or include, for example, a wired or fiber optic Ethernet network, a wireless backhaul, or other high speed network. The communications network 115 may be a local area network dedicated to interconnecting the elements of the wireless communications network system 100. When one or both of the management system 110 and location server 150 are located in the cloud, the communications network 115 may be or include the Internet.

In FIG. 1, a dashed line connection between elements indicates a wireless communications path between elements of the wireless network system and user devices. Wireless communications between the elements of the wireless communications system 100 and user devices may adhere to the Wi-Fi™ industry standard which is based on the IEEE 802.11 standards. Each access point 120, 122, 124, 126, 128, 103, 132 periodically broadcasts control frames. These control frames may include, for example, "beacon" frames announcing its presence and providing information necessary for a user device to establish communications. These control frames may include probe request frames and probe response frames. Control frames transmitted by one access point are received by other access points. Each access point 120, 122, 124, 126, 128, 130, 132 maintains a list of its neighbors, which is to say a list of other access points from which it receives control frames. In this example, access point 120 receives control frames from access points 122, 124, 126, and 128, and has identified those access points as "neighbors". Since access point 120 does not receive control frames from other access points, such as access points 130 and 132, access point 120 may be unaware of, or oblivious to, access points other than its four neighbors (i.e., access points 122, 124, 126, 128).

The user device 140 also receives beacon frames broadcast by at least some of the access points. In the example of FIG. 1, user device 140 receives beacon frames from access points 120, 122, 124, and 130. A user device typically associates with one access point selected from the access points from which the user device receives beacon frames. In an IEEE 802.11 system, each receiver generates a received signal strength indicator (RSSI) for each signal that is received. RSSI is an indication, which may be expressed in dBm or arbitrary units, of the power level being received by the receiver. The higher the RSSI value, the stronger the signal. Each RSSI value can be associated with the device that transmitted the received signal. A user device may, for example, identify the beacon frame having the highest RSSI value and request association with the respective access point.

While a user device is typically associated with a particular access point, other nearby access points still receive transmissions from user devices within the respective coverage areas of the access points. Each access point receiving transmissions from a user device will generate a respective RSSI for the user device. In the example of FIG. 1, the user device 140 may be associated with access point 120, and transmissions from the user device 140 may be received by access points 120, 122, 124, and 130. Each of the access points 120, 122, 124, and 130 defines a respective RSSI value for user device 140. Other access points may be unaware of user device 140.

A user device's location may be determined based on the relative strength of signals received or transmitted by the user device. To locate a particular user device in a conventional wireless network, the location server 150 requests from some or all of the access points in the wireless network RSSI values for signals received from the particular user device. Alternatively or additionally, the location server requests from the particular user device being located RSSI values for signals received from various access points. The approximate location of the user device is then calculated by the location server based on the reported RSSI values and the physical locations of the access points (which are known to the location server). The location of the user device may be calculated, for example, by forming a weighted sum of the locations of the access points, using weights derived from the respective RSSI values. The accuracy of the estimation may be improved by establishing a "fingerprint" of the environment in which the wireless network operates. Such a fingerprint may be established, for example, by manually moving a user device to multiple locations within the environmental and recording RSSI values for each location.

Having the location server calculate device location based on RSSI values received from access points and/or user devices has been a usable approach to determining the location of a single user device or a small number of user devices. Determining the location of a large number of user devices, or all the user devices on the wireless network system 100, places a very substantial communications and processing burden on the location server 150. An improved approach is to distribute the required communications and processing among the access points of the wireless network system.

Figure 2:
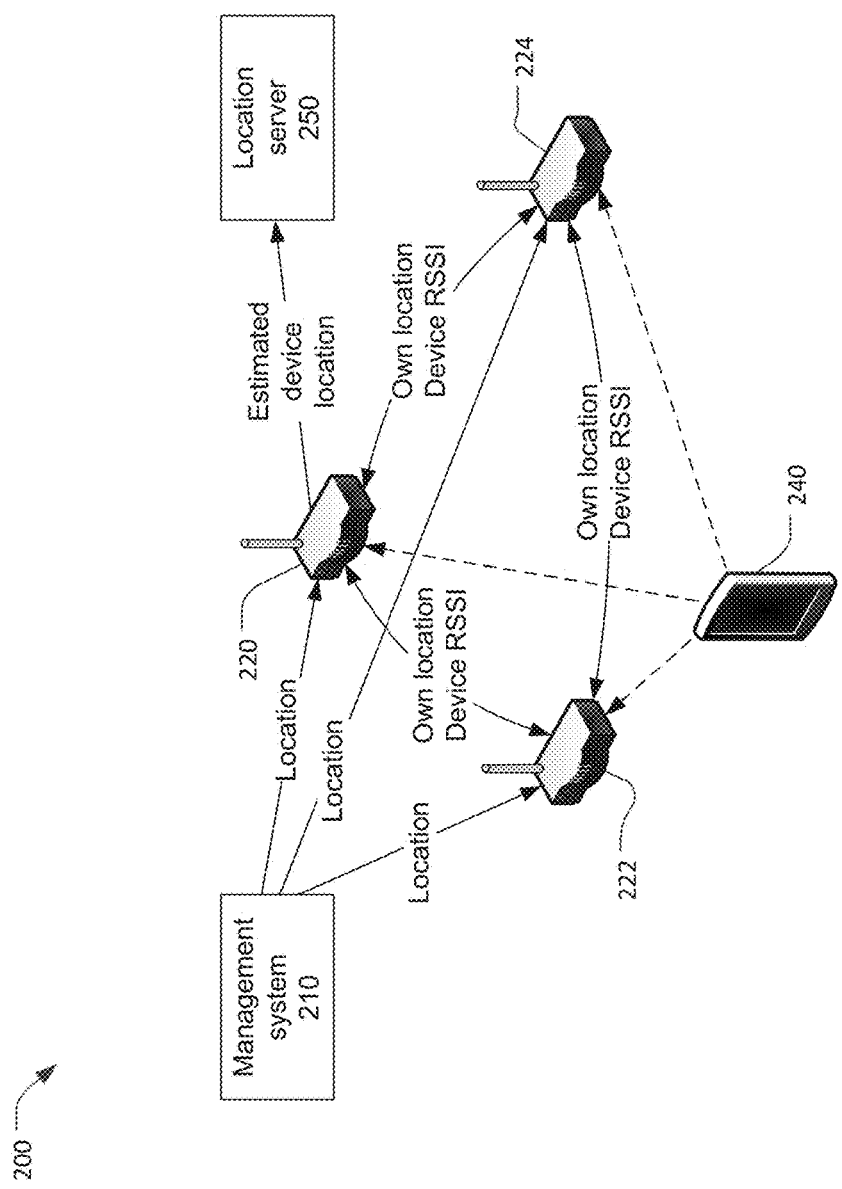
FIG. 2 is a block diagram illustrating information flow in a wireless network system.

FIG. 2 is a block diagram of a portion of a wireless network system 200 that performs distributed device location determination. The wireless network system 200 may include additional access points and user devices not shown in FIG. 2. The portion shown in FIG. 2 includes only those elements of the wireless network system 200 that are involved in estimating a position of the user device 240. These elements include a management system 210, a location server 250, and three access points 220, 222, 224. The three access points 220, 222, 224 are assumed to be the only access points that receive transmissions from the user device 250. In FIG. 2, solid arrows indicate information flow via a management communications network (for example, 115 in FIG. 1) and dashed arrows indicate information flow between elements of the wireless network system 200 and user devices via wireless communications.

The management system 210 has responsibility for overall management of the wireless network system 200. One function of the management system 210 is assigning a channel to each of the access points in the wireless network system 200. To assign channels in a manner that minimizes interference between the access points, the management system 210 needs to be aware of the location of each access point. Data indicating the location of each access point may be provided to the management system when the wireless network system 200 is installed. Subsequently, data indicating the location of each new or relocated access point may be provided to the management system when the wireless network system 200 is modified.

The data indicating the location of each installed or relocated access point may be manually entered into the management system. For example, data indicating the location of a particular access point may be entered by a technician by identifying the position of the access point on a facility drawing or a map, or by manually entering coordinates of the access point. The location of each access point may then be stored, for example in a table, within the management system. The location of each access point may be defined and stored as coordinates within a two-dimensional or three-dimensional coordinate system that allows calculation of distances between pairs of access points.

Each of the access points 220, 222, 224 receives information indicating its own location from the management system 210. For example, the management system 210 may send a unicast message to each access point containing information identifying the respective location. The management system 210 may issue a broadcast message containing information identifying the locations of multiple access points. In this case, each access point may extract information identifying its own location from the broadcast message. The management system may distribute information indicating the locations of the access points in some other manner.

The access points 220, 222, 224 receiving transmissions from the user device 250 define respective RSSI values associated with the user device 250. Each access point 220, 222, 224 defines an RSSI value associated with every device from which it receives signals. Each access point 220, 222, 224 also receives transmissions, such as beacon frames, from other access points, which allows each access point to establish a list of its neighboring access points. In the example of FIG. 2, access points 220, 222, 224 are assumed to be neighbors to each other.

To perform distributed device location determination, each access point 220, 222, 224 exchanges, with each of its neighbor access points, data indicating its own location and an RSSI value associated with the user device 240. Specifically, access point 220 transmits its location and RSSI value associated with the user device 240 to access points 222 and 224. Similarly, access point 222 transmits its location and RSSI value associated with the user device 240 to access points 220 and 224, and access point 224 transmits its location and RSSI value associated with the user device 240 to access points 220 and 222. This data may be transmitted over the management communications network as unicast, multicast, or broadcast messages.

After location and RSSI data have been exchanged between the access points, each access point 220, 222, 224 knows its own location and the location of its two neighboring access points. Further, each access point 220, 222, 224 knows its own RSSI associated with the user device 140 and the RSSI values its two neighboring access points associate with the user device 140. Thus each access point 220, 222, 224 knows the signal strength of transmissions from the user device 140 at three different locations, which is sufficient for estimating a location of the user device 240 as previously described. However, it is only necessary for one of the three access points 220, 222, 224 to estimate the location and report the estimated location to the location server 250. Conveniently, the access point having the highest RSSI value for the user device 240 (which is likely, but not necessarily, the closest access point to the user device) may perform the necessary calculations. An access point to perform the necessary calculations may be selected in some other manner, such as randomly or in rotating order.

In the example of FIG. 2, it is presumed that access point 220 has the highest RSSI value and thus calculates and reports the estimated device location to the location server 250. The location server 250 stores the reported estimated device location for the user device 240.

Figure 3:
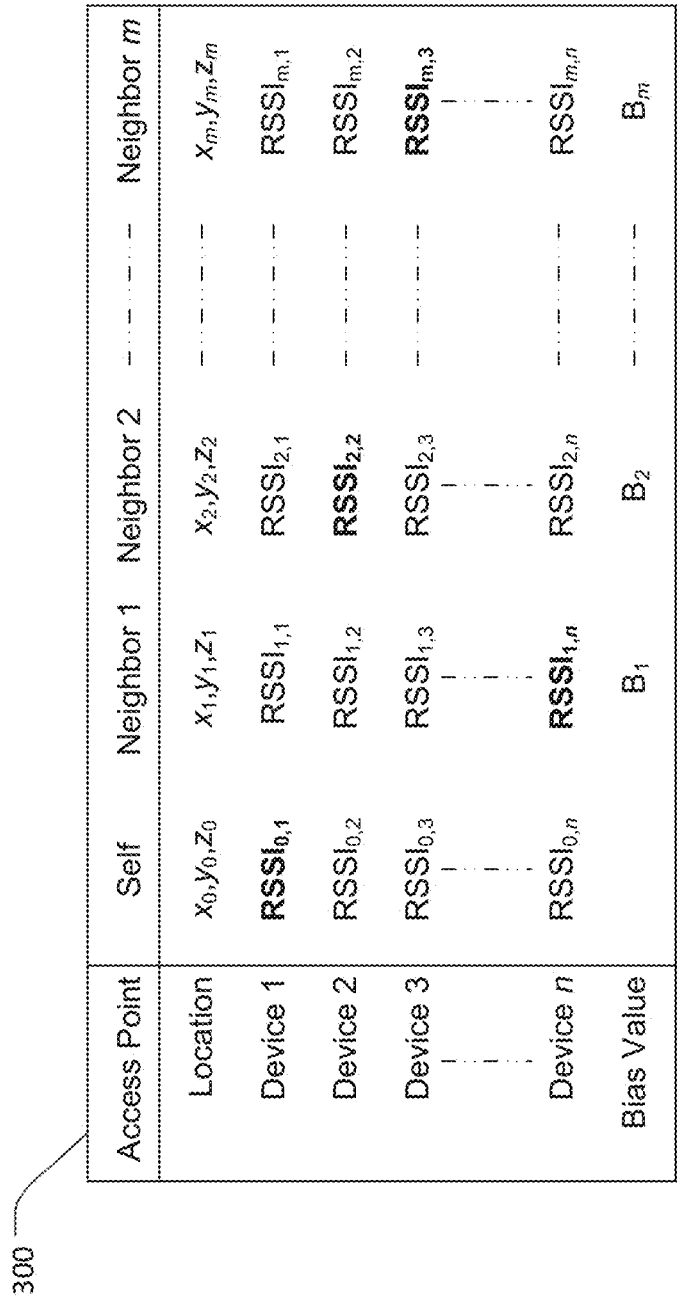
FIG. 3 is an exemplary Station/RSSI table.

FIG. 3 summarizes the information accumulated by each access point in a wireless network system (such as the wireless network system 200) that performs distributed device location. In FIG. 3, this information is organized in a table 300 for ease of description. Organizing the data in tabular form is exemplary. An access point may organize and store comparable information in variety of different data structures such as linked lists.

In the table 300, each column (excluding the left hand column) lists information associated with a different access point. Information associated with the access point in which the table 300 (or equivalent data) is stored is located in the column labeled "self". Information associated with m neighbor access points, where m is an integer number, is located in the respective columns. To allow user device location estimation, m must be at least two. The information associated with each access point includes a respective location. In this example, $x_0$, $y_0$, $z_0$ represents the location of the access point in which the table 300 (or equivalent data) is stored, and $x_i$, $y_i$, $z_i$ represents the location of access point i, where i is an integer from 1 to m.

The information associated with each access point includes a respective RSSI value for n user devices whose transmission are received at access point 0 (the access point in which the table 300, or equivalent data, is stored), where n is a positive integer. RSSI values for a particular user device are stored in the corresponding row of the table 300. Specifically, $RSSI_{0,1}$ is the RSSI value for user device 1 at access point 0. $RSSI_{m,n}$ is the RSSI value for user device n at access point m. All of the m access points do not necessarily receive transmission from all of the n user devices. When a particular access point does not receive transmissions from a particular user device, the corresponding RSSI value may be set to zero or an arbitrarily low value.

The information associated with each access point may optionally include a bias value $B_1$-$B_m$. As will be discussed subsequently, the bias values $B_1$-$B_m$ are may be used to improve the accuracy of user device location estimation.

Each access point within a wireless communications network system may accumulate and store information comparable to the table 300. These tables need not be identical, since each access point may have a somewhat different set of neighbors and receive transmissions from a somewhat different set of user devices. For example, the access points identified as "Neighbor 1" and "Neighbor 2" in the table 300 are both neighbors of the access point "Self", but are not necessarily neighbors of each other. For further example, access point "Neighbor 1" may receive transmissions from one or more user devices that are not received by access point "Self", and are thus not listed in the table 300.

The access point in which the table 300, or equivalent information, is stored has the information necessary to determine a location for each of the user devices Device 1 to Device n. However, having this access point determine the location of all n user devices may place a substantial computation burden that interferes with the performance of other duties, such as controlling communications with the user devices. Instead, the task of determining the location of the user devices is distributed among this access point and its neighbors.

Distributing responsibility for determining user device locations among a plurality of access points may be accomplished in a variety of ways. Access points receiving transmissions from a particular user device may use a collaborative process to assign or negotiate responsibility for determining the position of the particular user device. Such collaboration would involve communications between the access points and thus increase both traffic on the network 115 and the workload on the access points. A better technique for distributing the task of determining the location of the user devices is for each access point to independently determine whether it is, or is not, responsible for determining the location of each user device. For example, five access points reporting RSSI values for transmissions received from a particular user device could each calculate the modulo 5 value of a parameter (e.g. the MAC address) of the particular user device. The result can then be used by each access point to determine whether or not it is responsible for determining the location of the user device.

A straightforward technique to distribute responsibility for determining the location of the user devices is for the access point that reports the highest RSSI value for a particular user device to assume responsibility for determining the location of that user device. Each access point can make this determination independently based upon data received from its neighboring access point. For example, in the rows of table 300 corresponding to user devices, a single Bold entry represents the highest RSSI value reported for that user device. In the example of FIG. 3, since $RSSI_{0,1}$ is the highest RSSI value for Device 1, access point Self takes responsibility for determining the location of that user device. Similarly, Neighbor 1 assumes responsibility for determining the location of Device n, Neighbor 2 assumes responsibility for determining the location of Device 2, and Neighbor m assumes responsibility for determining the location of Device 3.

While not shown in the table 300, the highest RSSI value for a user device may be determined coincidentally by two or more access points. For example, two access points may report the same RSSI value for a user device if the user device is equidistance from the two access points. In this situation, all of the two or more access points may determine and report a location for the user device (leaving the location server to sort out how to use the multiple reported locations). Alternatively, a particular one of the two or more access points may be selected, based a predetermined criteria, to determine and report the location of the user device.

In some circumstances, using the highest RSSI value to determine which access point estimates the location of each user device may result in one access point having responsibility for a disproportionate number of user devices. For example, at a trade show, an access point near a particularly interesting exhibit may be responsible for a large number of devices belonging to users attracted to the exhibit. In this situation, an access point other than the access point reporting the highest RSSI value may estimate the location of some user devices. For example, an access point reporting the highest RSSI value for a particular user device may request another access point (e.g. the access point reporting the second highest RSSI for that device) estimate the user device location.

Figure 4:
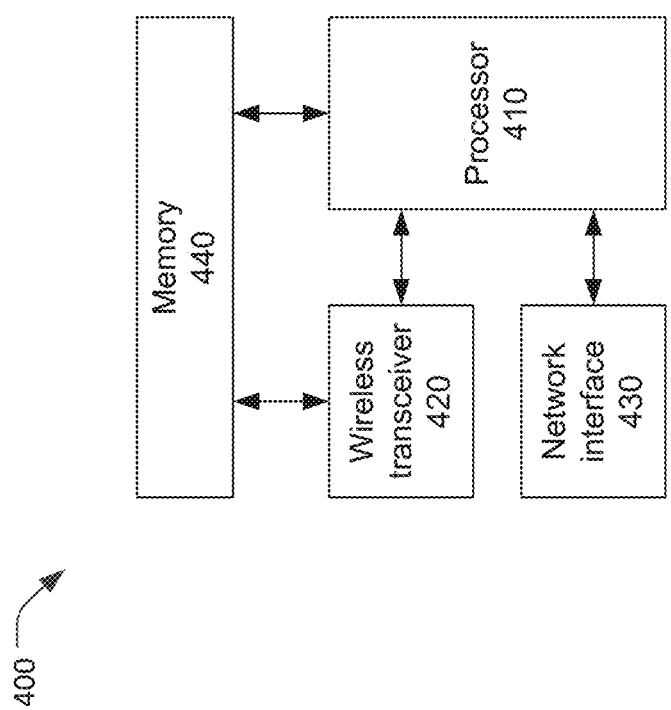
FIG. 4 is a block diagram of an access point.

FIG. 4 is a block diagram of an access point 400 which may be any of the access points 220, 222, 224 shown in FIG. 2. The access point 400 may include a processor 410 coupled to a wireless transceiver 420, a network interface 430, and a memory 440

The processor 410 provides computing resources to the access point 400. The processor 410 may be any suitable custom or commercial microprocessor, microcontroller, computing chip or other type of processor. The access point 400 may also include supporting circuitry (not shown) for the processor 410 such as clock circuitry, I/O ports, a direct memory access controller, and other supporting circuitry. The processor 410 may also manage a bus system for communicating with its support circuitry and with the wireless transceivers 420 and the network interface 430. A security co-processor (not shown) may also be included in the access point 400.

The wireless transceiver 420 includes baseband and radio-frequency circuits required to transmit and receive frames. For example, the wireless transceiver 420 may include transmitter and receiver radio-frequency circuits, a signal processor, a baseband processor, a media access controller, a packet and queue controller, and other circuits. The baseband processor, the packet and queue controller, and the media access controller may be implemented by software running on a suitable processor, by one or more application specific integrated circuits (ASIC), by one or more field programmable gate arrays, or by combinations thereof. All or portions of the packet and queue controller and the media access controller may be implemented by software running on the processor 410.

The network interface 430 includes input/output circuitry for communicating over a data network which may be or include the Internet. The network interface 430 may be used to communicate with the cloud 110. Alternatively, or additionally, the network interface 430 may be used to communicate with other devices via a local area network. For example, the network interface of the access point 220 is used to communicate with other access points 222, 224, the management system 210, and the location server 250. The network interface 430 preferably allows for the highest possible speed connection. For example, the network interface 430 may include a 10 Mbs (megabits per second), 100 Mbs, 1 Gbs (gigabits per second), 2.5 Gbs, 5 Gbs or 10 Gbs Ethernet interface. The network interface 430 may include multiple interfaces with failover support between interfaces.

The memory 440 may include one or more of read-only memory, random-access memory, flash memory, and programmable read-only memory. The memory 440 may store program instructions for execution by the processor. The memory 440 may store data used by the access point 400, such as transmitter and receiver queues managed by the wireless transceiver 420 and or the processor 410.

Description of Processes

Figure 5:
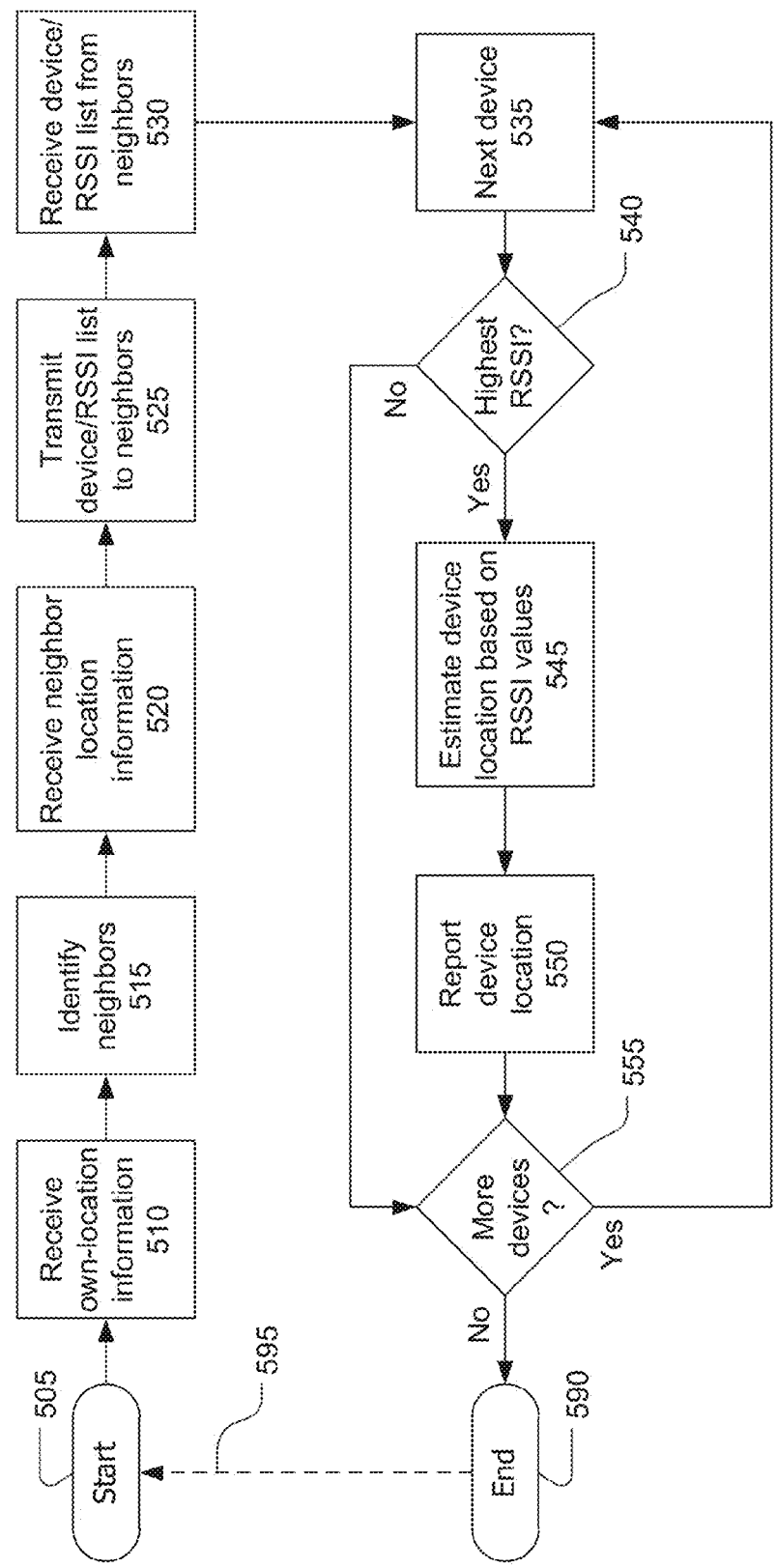
FIG. 5 is a flow chart of a method for distributed device location determination.

Referring now to FIG. 5, a process 500 for distributed user device location determination starts at 505 and ends at 590. The process may be performed by an access point, such as any of the access points 120 to 132 in a wireless communications system such as the wireless communications system 100. A separate instantiation of the process 500 may be performed by any and all of the access points in a wireless communications system. Multiple access points with a wireless communications system may perform the process 500 synchronously or independently. The process 500 may be repeated, as indicated by the dashed arrow 595, periodically, such as at intervals of 10 seconds, 30 seconds, 1 minute, or 5 minutes, or some other interval. The process 500 is partially cyclic, with the actions from 535 to 555 repeated for each of a plurality of user devices.

At 510, the access point receives own-location information indicating its own location from an external source. For example, the access point may receive the own-location information from a management system, such as the management system 110 in the wireless communications system 100. The own-location information may be received via a communications link, such as the communications network 115 in the wireless communications system 100. The own-location information may be received in a unicast message, or may be extracted from a multicast or broadcast message. The access point may include a GPS component from which it determines its own location. The action at 510 need not necessarily be performed during each repetition of the process 500. For example, the own-location information may be received during each repetition of the process 500, at some other interval such as hourly or daily, or only immediately after the access point is initially installed, relocated, or restarted.

At 515, the access point identifies its neighbors or neighboring access points. Neighboring access points may be defined as other access points from which beacon frames are received or other access points from which beacon frames are received with received power levels above a threshold level. At 515, the access point may listen for beacon frames meeting the appropriate definition and form a list of neighboring access points.

At 520, the access point receives neighbor location information defining the locations of some or all of the neighboring access points identified at 515. The neighbor location information may be received from a management system, such as the management system 110. Respective neighbor location information may be received from each neighboring access point. An access point for which neighbor location information is not received is not useable for device location determination and may be discarded from the list of neighboring access points. The actions at 515 and 520 need not necessarily be performed during each repetition of the process 500. For example, neighbor location information may be received during each repetition of the process 500, at some other interval such as hourly or daily, or only immediately after the access point or one of its neighboring access points is initially installed, relocated, or restarted.

At 525, the access point transmits a list of user devices and respective RSSI values to its neighbors. This data may be transmitted as unicast messages to each neighbor, as a single multicast message to all of the neighbors, or in some other manner. During some or all repetitions of the process 500, the data transmitted from the access point to its neighbors at 525 may also include the own-location information from 510.

At 530, the access point receives a list of user devices and respective RSSI values from each neighbor. This data may be received in unicast messages or multicast messages from each neighbors, or in some other manner. The data received from each neighbor at 530 may also include respective neighbor information. The actions at 525 and 530 may be performed in either order or concurrently.

At the conclusion of the actions at 525 and 530, the access point will have accumulated information comparable to the information in the table 300 of FIG. 3. The access point then determines whether or not the access point has responsibility to perform the calculations to determine the location of each user device. At 535, the access point selects a user device. For example, assuming the information accumulated by the access point is stored in a table such as the table 300, the access point may initially select the device corresponding to the top row of the table and subsequently proceed down the rows of the table in sequential order.

At 540, the access point decides whether or not it is responsible to determine a location of the user device selected at 535. For example, the access point may examine the RSSI values reported for the selected user device (e.g. the RSSI values in the corresponding row of the table 300) to determine if its own RSSI value is the highest RSSI value (or tied for highest RSSI) value for that user device. When its own RSSI value is the highest (or tied for highest) reported RSSI value, the access point decides at 540 that it is responsible for determining the location of the selected user device ("yes" at 540). When its own RSSI value is not the highest reported value, the access point decides at 540 that it is not responsible for determining the location of the selected user device ("no" at 540). The access point may use some other criteria at 540 to decide whether or not it is responsible for determining the location of the selected user device.

When the access point decides that it is not responsible for determining the location of the selected user device ("no" at 540), the process 500 proceeds to 555 where a determination is made whether or not there are more user devices to consider. When there are more user devices to consider ("yes" at 555) the process 500 returns to 535 to select another user device. The actions from 535 to 555 are repeated cyclically until all user devices have been considered. When all user device have been considered ("no" at 555), the process 500 ends at 590.

When a decision is made at 540 that the access point is responsible for determining the location of the selected user device ("yes" at 540), the user device location may be determined at 545 and subsequently reported at 550. Determination of the user device location will be discussed subsequently.

The location of the selected user device determined at 545 may be reported at 550 to a server such as the location server 250. The process 500 then proceeds to 555 where a determination is made whether or not there are more user devices to consider. When there are more user devices to consider ("yes" at 555) the actions from 535 to 555 are repeated cyclically until all user devices have been considered. When all user device have been considered ("no" at 555), the process 500 ends at 590.

The user device location may be determined at 550 based on the RSSI values reported by various access points and the locations of those access points. For example, the location of a user device may be determined using the formula:

$$d_k = \frac{\sum_{i=0}^{n}(w_{i,k})p_i}{\sum_{i=0}^{n}(w_{i,k})} \quad (1)$$

where
$d_k=(x_k, y_k, z_k)$=location of user device k;
$p_i=(x_i, y_i, z_i)$=location of access point i;
$w_{i,k}$=weight derived from the RSSI value reported by access point i for device k;
n=number of neighboring access points reporting RSSI for device k.

Assume, for the purpose of discussion, that the access points and user devices are located in an ideal environment free from intervening objects, multipath interference, and other artifacts that effect signal strength. Further assume that the access points and user devices are omnidirectional, which is to say they radiate and receive equally in all directions. In such an environment, received signal strength will be inversely proportional to the square of the distance between a transmitter and receiver. Each weight $w_{i,k}$ may be defined as the square root of the path loss (i.e. power received divided by power transmitted) between access point i and user device k converted from dB into linear units. In this situation, equation (1) may be used to calculate the location of a user device with some precision.

In real environments, signals propagating are attenuated by and/or reflected from, intervening objects such as walls and other structures, furniture, vehicles, and people disposed between the transmitter and the receiver. Additionally received signal strength may be impacted by multipath interference and other phenomenon. Further, the attenuation of intervening objects and the effects of multipath interference and other phenomenon may change over time. Thus, in real environments, it is not practical to precisely calculate the location of a user device because of factors that are not known to, or controllable by, the access point performing the calculation.

Figure 6:
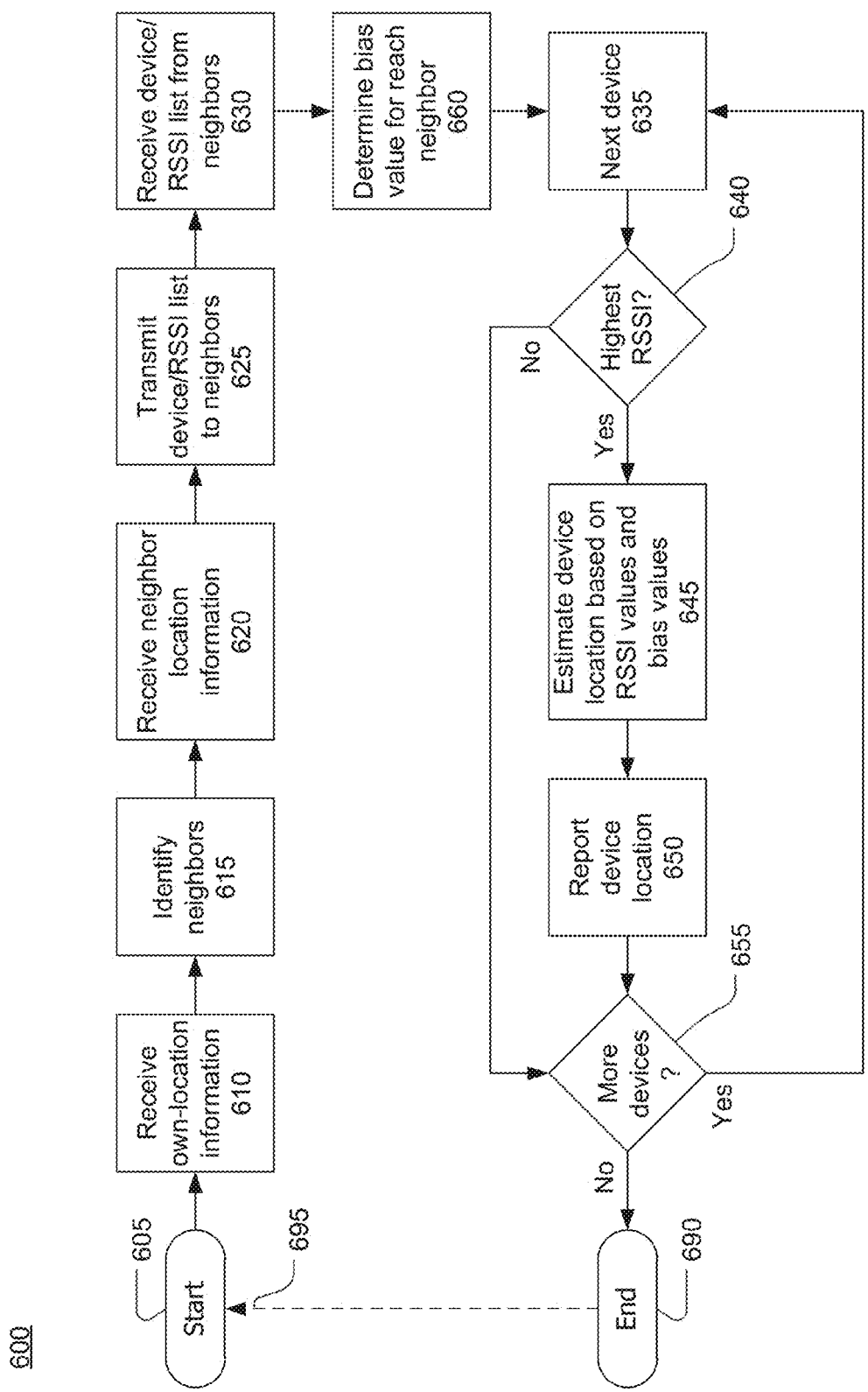
FIG. 6 is a flow chart of another method for distributed device location determination.

Referring now to FIG. 6, a process 600 for distributed user device location estimation starts at 605 and ends at 690. The process 600 may be performed by an access point, such as any of the access points 120 to 132 in a wireless communications system such as the wireless communications system 100. A separate instantiation of the process 600 may be performed by any and all of the access points in a wireless communications system. Multiple access points with a wireless communications system may perform the process 600 synchronously or independently. The process 600 may be repeated, as indicated by the dashed arrow 595, periodically, such as at intervals of 10 seconds, 30 seconds, 1 minute, or 5 minutes, or some other interval. The process 600 is partially cyclic, with the actions from 635 to 655 repeated for each of a plurality of user devices.

The process 600 is similar to the process 500, but uses a simplified algorithm for estimating user device location. Actions 605-640, 650-655, and 690 in the process 600 are identical to the counterpart actions in the process 500. Descriptions of these actions will not be repeated.

In the process 600, the location of each user device is estimated at 645 using the formula:

$$e_k \approx \frac{\sum_{i=0}^{n}(B_i + RSSI_{i,k})p_i}{\sum_{i=0}^{n}(B_i + RSSI_{i,k})} \quad (2)$$

where $e_k=(x_k, y_k, z_k)$=estimated location of user device k;
$p_i=(x_i, y_i, z_i)$=location of access point i;
$B_i$=bias value for access point i;
$RSSI_{i,k}$=RSSI value (in dBm) reported by access point i for device k;
n=number of neighboring access points reporting RSSI for device k.

In equation (2), the location of user device k is estimated as a weighted sum of the access point locations, where each weight $(B_i+RSSI_{i,k})$ is obtained by adding a bias value to the RSSI value, in dBm, reported by each access point for user device k. Note that equation (2) does not require converting RSSI values from dBm to linear units.

In the simplest case, a single bias value may be used. This bias value may be equal to, or slightly greater than, the absolute value of the receiver noise floor of the access points. For example, a typical access point receiver noise floor may be −95 dBm and the bias value may be set to 95 or slightly larger. In this case, access points reporting RSSI values at or near the noise floor will have a weight $(B_i+RSSI_{i,k})$ near zero in equation (2). Access points reporting higher RSSI values will have correspondingly higher weights.

The accuracy of the user device location estimates may be improved by using access point specific bias values in equation (2). Bias values may be determined for each neighbor at 660 in the process 600, after the neighbors are identified at 615 and location information is received at 610 and 620.

Figure 7:
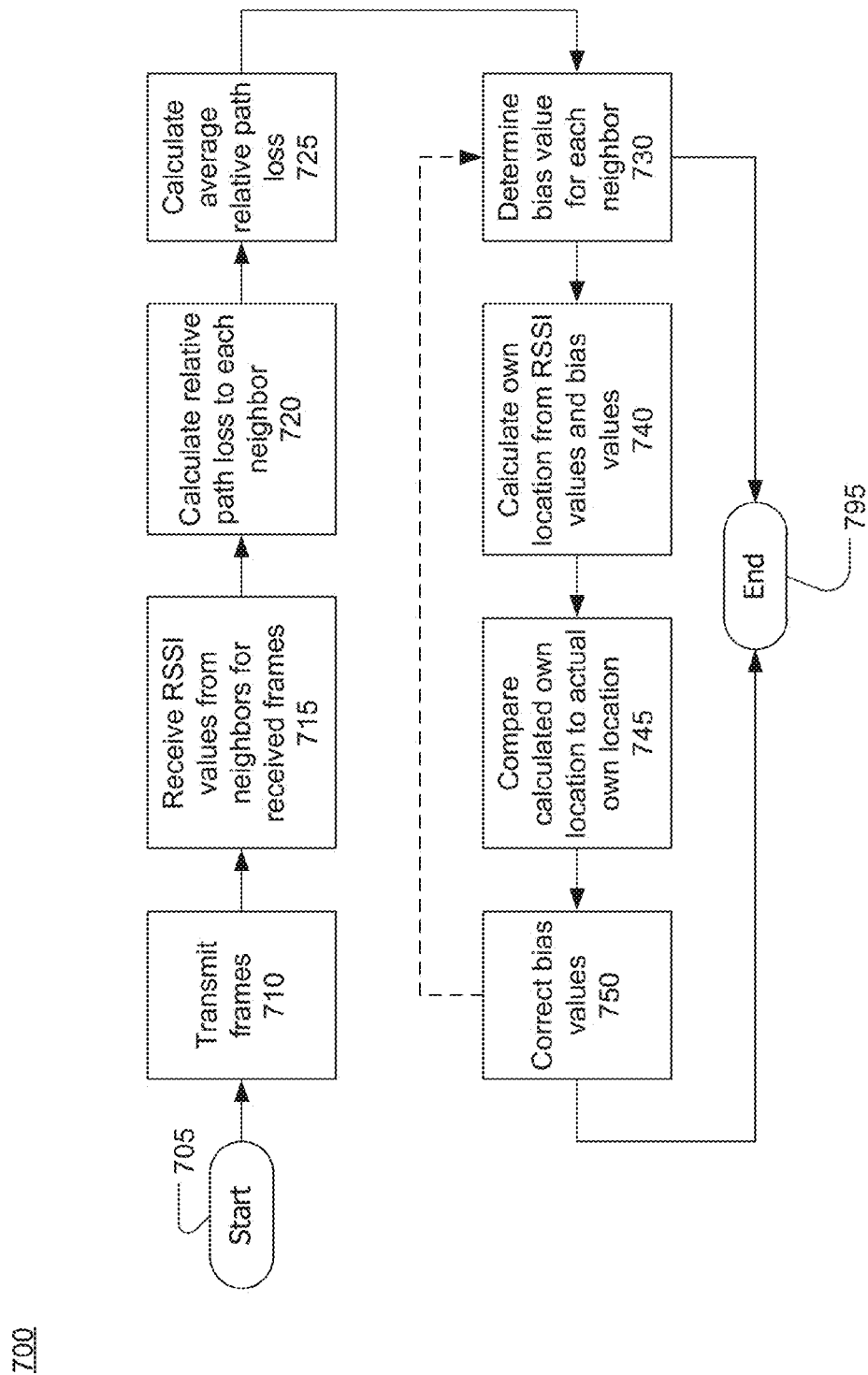
FIG. 7 is a flow chart of a method for setting access point bias values.

FIG. 7 is a flow chart of a process 700 for determining bias values suitable for use at 660 in the process 600. The process 700 starts at 705, after the neighboring access points have been identified and position information has been received. The process 700 ends at 795. The process 700 may be performed by an access point, such as any of the access points 120 to 132 in a wireless communications system such as the wireless communications system 100. A separate instantiation of the process 700 may be performed by any and all of the access points in a wireless communications system. Multiple access points with a wireless communications system may perform the process 700 synchronously or independently. The process 700 may be repeated every time the process 600 is performed. The process 700 may be performed periodically, such as at intervals of 10 seconds, 30 seconds, 1 minute, or 5 minutes, or some other interval.

At 710, access point 0 (the access point performing the process 700) transmits beacon frames or other frames that are received by neighboring access points. At 715, access point 0 receives reported from its neighbors indicating RSSI values for the received frames.

At 720, access point 0 first calculates a path loss between itself and each neighbor, using equation (3):

$$PL_i = T + RSSI_i \quad (3)$$

where:

$PL_i$=path loss between access point 0 and access point i;
T=transmission power of access point 0;
$RSSI_i$=RSSI value reported by access point i for frames received from access point 0; and
i=number of neighboring access points.

Access point 0 then calculates a relative path loss (relative to distance) for each neighboring access point using equation (4):

$$PLR_i = \frac{PL_i}{\text{Log}(d_i)} \quad (4)$$

where:

$PLR_i$=relative path loss between access point 0 and access point i; and
$d_i$=distance from access point 0 to access point i.

At 725, access point 0 calculates as average relative path loss using equation (5):

$$PLRA = \frac{1}{n+1}\sum_{i=0}^{n} PLR_i \quad (5)$$

where:

PLRA=average relative path loss.

At 730, access point 0 determines a specific bias value for each neighboring access point in accordance with equations (6) and (7):

$$B_i = B_o \frac{PLR_i}{PLRA} \quad (6)$$

where B0 is a predetermined bias value for access point 0 (the access point performing the process 700). Bias values for the other access points are proportional to the respective relative path loss. Bias values may be constraint to a limited range in accordance with equation (7):

$$B_{min} \leq B_i \leq B_{max} \quad (7)$$

where $B_{min}$ and $B_{max}$ are predetermined constants. For example, in the case where the access point receiver noise floor is −95 dBm, $B_{min}$, $B_0$, and $B_{max}$ may be 90, 100, and 110 respectively. When equation (6) results in a value below $B_{min}$, $B_i$ is set equal to $B_{min}$. Conversely, when equation (6) results in a value above $B_{max}$, $B_i$ is set equal to $B_{max}$. When all of the $B_i$ values have been determined at 730, the process 700 may end at 795.

Optionally, machine learning may be employed to improve the accuracy of the position estimates made using the process 600. For example, at 740 in the process 700, the received RSSI values from 715 and the bias values from 730 may be used to calculate the own location of user device 0. The own location may be calculated using equation 2, modified to compute the sums for values of i from 1 to n.

The own location calculated at 740 may then be compared with the actual own location (from 610 in the process 600) at 745. The difference between the calculated and actual locations may be used at 750 to correct some or all of the bias values at 750. One or more of the bias values may be changed at 750. Alternatively, one or more of $B_{min}$, $B_0$, and $B_{max}$ could be changed at 750 and the process returned to 730 (as indicated by the dashed arrow) to re-determine some or all of the bias values. After corrected bias values are determined, the process 700 ends at 795.

THE CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for estimating a location of a user device in a wireless communications network, comprising:
three or more access points defining a respective received signal strength indicator (RSSI) value for transmissions received from the user device;
all of the three or more access points sending the respective RSSI values to the other access points of the three or more access points;
all of the three or more access points comparing its own RSSI value associated with the user device to RSSI values associated with the user device received from the other access points of the three or more access points;
an access point having an own RSSI value associated with the user device higher than RSSI values associated with the user device received from the other access points determining it is responsible for estimating the location of the user device;
access points having own RSSI values associated with the user device less than at least one RSSI value associated with the user device received from the other access points determining they are not responsible for estimating the location of the user device; and
the responsible access point estimating a location of the user device based, at least in part, on the RSSI values associated with the user device.

2. The method of claim 1, further comprising:
all of the three or more access points receiving location information indicating locations of all of the three or more access points; and
the responsible access point estimating the location of the user device based, at least in part, on the RSSI values associated with the user device and the location information.

3. The method of claim 2, further comprising:
the responsible access point estimating the location of the user device in accordance with the formula:

$$d = \frac{\sum_{i=1}^{n} (w_i) p_i}{\sum_{i=1}^{n} (w_i)}$$

where
d=(x, y, z)=location of the user device;
$p_i=(x_i, y_i, z_i)$=location of access point i;
wi=weight determined from the RSSI value reported by access point i;
n=number of access points.

4. The method of claim 3, further comprising:
the responsible access point determining, for each access point i of the three or more access points, the respective weight wi by adding a respective bias value to the RSSI value associated with the user device reported by access point i.

5. The method of claim 4, further comprising:
the responsible access point setting, for each access point i of the three or more access points, the respective bias value to a predetermined value.

6. The method of claim 4, further comprising:
the responsible access point setting, for each access point i of the three or more access points, the respective bias value by:
determining a respective relative path loss between the responsible access point and each of the other access points of the three or more access points; and
setting the respective bias value associated with each of the other access points proportional to the respective relative path loss.

7. The method of claim 1, further comprising:
the responsible access point sending an estimate of the location of the user device to a location server.

8. A method performed by every access point (AP) of a group of three or more access points that receive transmissions from a user device in a wireless communications network, comprising:
defining an own received signal strength indicator (RSSI) value for transmissions received from the user device;
transmitting the own RSSI value associated with the user device to the other access points of the group of access points;

receiving, from the other access points of the group of access points, respective other AP RSSI values for transmissions received from the user device at the other access points;

comparing the own RSSI value associated with the user device to the other AP RSSI values associated with the user device;

determining to estimate a location of the user device when the own RSSI value associated with the user device is greater than or equal to all of the other AP RSSI values associated with the user device; and when a determination is made to estimate the location of the user device, estimating the location of the user device based, at least in part, on the own RSSI value associated with the user device and the other AP RSSI values associated with the user device.

9. The method of claim 8, further comprising:

receiving location information indicating an own location and respective locations of all other access points of the group of access points; and when a determination is made to estimate the location of the user device, estimating the location of the user device based, at least in part, on the own RSSI value associated with the user device, the other AP RSSI values associated with the user device and the location information.

10. The method of claim 9, further comprising:

when a determination is made to estimate the location of the user device, estimating the location of the user device in accordance with the formula:

$$d = \frac{\sum_{i=1}^{n}(w_i)p_i}{\sum_{i=1}^{n}(w_i)}$$

where d=(x, y, z)=location of the user device;

$p_i$=($x_i$, $y_i$, $z_i$)=location of access point I, where access point 0 is the access point performing the method and access points 1 to n are the other access points in the group of access points;

wi=weight determined from the RSSI value reported by access point i;

n=number of access points.

11. The method of claim 10, further comprising:

determining, for each access point i, the respective weight wi by adding a respective bias value to the RSSI value associated with the user device reported by access point i.

12. The method of claim 11, further comprising:

setting, for each access point i, the respective bias value to a predetermined value.

13. The method of claim 11, further comprising:

setting, for each access point i, the respective bias value by:

determining a respective relative path loss between a self-elected access point and each of the additional access points; and setting the respective bias value associated with each of the additional access points proportional to the respective relative path loss.

14. The method of claim 8, further comprising:

when the location of the user device has been estimated, sending the estimate of the location of the user device to a location server.

15. An access point (AP) for a wireless communications network including three or more access points, comprising:

a receiver to define an own received signal strength indicator (RSSI) value for transmissions received from a user device;

a network interface;

a processor coupled to the receiver and the network interface; and a memory coupled to the processor, the memory storing instructions that, when executed by the processor, cause the access point to perform actions comprising:

transmitting, via the network interface, the own RSSI value associated with the user device to all other access points of the three or more access points;

receiving, via the network interface, respective other AP RSSI values for transmissions received from the user device at two or more additional access points from the other access points of the three or more access points;

comparing the own RSSI value associated with the user device to the other AP RSSI values associated with the user device;

determining to estimate a location of the user device when the own RSSI value associated with the user device is higher than or equal to all of the other AP RSSI values associated with the user device; and when a determination is made to estimate the location of the user device, estimating the location of the user device based, at least in part, on the own RSSI value associated with the user device and the other AP RSSI values associated with the user device.

16. The access point of claim 15, the actions performed further comprising:

receiving, via the network interface, location information indicating an own location and respective locations of the other access points of the three or more access points; and when a determination is made to estimate the location of the user device, estimating the location of the user device based, at least in part, on the own RSSI value associated with the user device, the other AP RSSI values associated with the user device and the location information.

17. The access point of claim 16, the actions performed further comprising: when a determination is made to estimate the location of the user device, estimating the location of the user device in accordance with the formula:

$$d = \frac{\sum_{i=1}^{n}(w_i)p_i}{\sum_{i=1}^{n}(w_i)}$$

where d=(x, y, z)=location of the user device;

$p_i$=($x_i$, $y_i$, $z_i$)=location of access point I, where access point 0 is the access point performing the method and access points 1 to n are the other access points in the group of access points;

wi=weight determined from the RSSI value reported by access point i;

n=number of access points.

18. The access point of claim 17, the actions performed further comprising:
   determining, for each access point i, the respective weight $w_i$ by adding a respective bias value to the RSSI value associated with the user device reported by access point i.

19. The access point of claim 18, the actions performed further comprising:
   setting, for each access point i, the respective bias value to a predetermined value.

20. The access point of claim 18, the actions performed further comprising:
   setting, for each access point i, the respective bias value by:
   determining a respective relative path loss between a self-elected access point and each of the other access points of the three or more access points; and
   setting the respective bias value associated with each of the additional access points proportional to the respective relative path loss.

21. The access point of claim 15, the actions performed further comprising:
   when the location of the user device has been estimated, sending the estimate of the location of the user device to a location server.

* * * * *